(12) United States Patent
Nisbet et al.

(10) Patent No.: US 11,050,764 B2
(45) Date of Patent: Jun. 29, 2021

(54) CARDINALITY-BASED ACTIVITY PATTERN DETECTION

(71) Applicant: CrowdStrike, Inc., Irvine, CA (US)

(72) Inventors: Brody Nisbet, Newcastle (AU); Andrew Roden, Newcastle, CA (US); John Lee, Cleveland, OH (US)

(73) Assignee: CrowdStrike, Inc., Irvine, CA (US)

( * ) Notice: Subject to any disclaimer, the term of this patent is extended or adjusted under 35 U.S.C. 154(b) by 212 days.

(21) Appl. No.: 16/110,927

(22) Filed: Aug. 23, 2018

(65) Prior Publication Data

US 2019/0268355 A1  Aug. 29, 2019

Related U.S. Application Data

(60) Provisional application No. 62/634,408, filed on Feb. 23, 2018.

(51) Int. Cl.
| | | |
|---|---|---|
| *H04L 29/06* | (2006.01) | |
| *G06F 16/245* | (2019.01) | |
| *G06F 16/248* | (2019.01) | |
| *G06F 11/30* | (2006.01) | |
| *G06F 11/32* | (2006.01) | |
| *G06F 11/34* | (2006.01) | |
| *G06F 21/55* | (2013.01) | |
| *H04W 12/12* | (2021.01) | |

(52) U.S. Cl.
CPC ...... *H04L 63/1416* (2013.01); *G06F 11/3006* (2013.01); *G06F 11/324* (2013.01); *G06F 11/3495* (2013.01); *G06F 16/245* (2019.01); *G06F 16/248* (2019.01); *G06F 21/55* (2013.01); *H04L 63/14* (2013.01); *H04L 63/1425* (2013.01); *H04W 12/12* (2013.01)

(58) Field of Classification Search
CPC . H04L 63/1416; H04L 63/14; H04L 63/1425; G06F 16/245; G06F 16/1248; G06F 21/55; G06F 11/324; G06F 11/3495; G06F 11/30006; H04W 12/12
See application file for complete search history.

(56) References Cited

U.S. PATENT DOCUMENTS

| | | | |
|---|---|---|---|
| 10,530,790 B2* | 1/2020 | Shih | H04L 63/10 |
| 2007/0209074 A1 | 9/2007 | Coffman | |
| 2009/0132340 A1* | 5/2009 | Demir | G06Q 30/02 |
| | | | 705/7.29 |
| 2009/0254970 A1 | 10/2009 | Agarwal et al. | |

(Continued)

OTHER PUBLICATIONS

The Extended European Search Report from the European Patent Office for Application No. 19158478.8, dated Jun. 12, 2019, a counterpart foreign application of U.S. Appl. No. 16/110,927, 7 pages.

(Continued)

*Primary Examiner* — Ashokkumar B Patel
*Assistant Examiner* — William B Jones
(74) *Attorney, Agent, or Firm* — Lee & Hayes, P.C.

(57) ABSTRACT

Cardinality-based activity pattern detection is described herein. Events on a computing system are monitored to detect patterns matching defined activity patterns. A cardinality-based activity pattern query is executed over data representing detected activity patterns to identify multiple, distinct defined activity patterns that have occurred during a particular time period.

26 Claims, 8 Drawing Sheets

(56) References Cited

U.S. PATENT DOCUMENTS

| | | | |
|---|---|---|---|
| 2011/0083180 | A1 | 4/2011 | Mashevsky et al. |
| 2011/0252032 | A1 | 10/2011 | Fitzgerald et al. |
| 2011/0320816 | A1 | 12/2011 | Yao et al. |
| 2014/0317741 | A1 | 10/2014 | Be'ery et al. |
| 2014/0325682 | A1* | 10/2014 | Turgeman ............. H04L 63/126 726/29 |
| 2015/0264062 | A1 | 9/2015 | Hagiwara et al. |
| 2016/0065601 | A1* | 3/2016 | Gong ................. H04L 63/1416 726/23 |
| 2016/0105454 | A1 | 4/2016 | Li et al. |
| 2016/0125094 | A1 | 5/2016 | Li et al. |
| 2016/0232032 | A1 | 8/2016 | Azvine et al. |
| 2016/0308888 | A1 | 10/2016 | Vargas Gonzalez |
| 2016/0330226 | A1 | 11/2016 | Chen et al. |
| 2016/0359875 | A1* | 12/2016 | Kim ...................... G06F 21/566 |
| 2017/0295189 | A1 | 10/2017 | Adir et al. |
| 2019/0266323 | A1 | 8/2019 | Nguyen et al. |
| 2019/0266324 | A1 | 8/2019 | Edwards et al. |
| 2019/0268361 | A1 | 8/2019 | Blewett et al. |

OTHER PUBLICATIONS

The Extended European Search Report from the European Patent Office for Application No. 19157857.4, dated Jun. 13, 2019, a counterpart foreign application of U.S. Appl. No. 16/110,927, 7 pages.

The Extended European Search Report from the European Patent Office for Application No. 19156473.1, dated Jun. 5, 2019, a counterpart foreign application of U.S. Appl. No. 16/110,927, 7 pages.

The Extended European Search Report from the European Patent Office for Application No. 19159021.5, dated Jun. 7, 2019, a counterpart foreign application of U.S. Appl. No. 16/110,927, 7 pages.

"Meet SIEM Needs with EventLog Analyzer", retrieved Sep. 27, 2017 from <<http://web.archive.org/web/20170710040843/https://www.manageengine.com/products/eventlog/security-information-event-management.html>>, 5 pages.

"Proactive Hunting the Last Line of Defense Against the 'Mega Breach'", Crowdstrike, Whitepaper, Sep. 13, 2016, 22 pages.

"Real-Time Event Correlation Engine", retrieved Sep. 27, 2017 from <<http://web.archive.org/web/20170710063729/https://www.manageengine.com/products/eventlog/event-correlation.html>>, 4 pages.

"Security Information and Event Management", retrieved on Sep. 27, 2017 from <<https://en.wikipedia.org/w/index.php?title=Security_information_and_event_management&oldid=801742075>>, Wikipedia, 3 pages.

"Using Pyke", retrieved on Feb. 15, 2019 from <<http://pyke.sourceforge.net/using_pyke/index.html>>, 2 pages.

"Backward Chaining", retrieved Feb. 15, 2019 from <<http://pyke.sourceforge.net/logic_programming/rules/backward_chaining.html>>, 5 pages.

Brown, D., "Understanding Indicators of Attack (IOAs): The Power of Event Stream Processing in CrowdStrike Falcon", Endpoint Protection, Mar. 14, 2017.

"Crowdstrike Falcon Overwatch 24/7 Managed Threat Hunting, Investigation and Response", Crowdstrike, 2 pages.

Gallant, Andrew, "Index 1,600,000,000 Keys with Automata and Rust", retrieved on Jul. 19, 2017 from <<http://blog.burntsushi.net/transducers/>>, Nov. 11, 2015, 50 pages.

Wang, Y-M., et al., "Gatekeeper: Monitoring Auto-Start Extensibility Points (ASEPs) for Spyware Management", 2004 LISA XVIII, Nov. 14-19, 2004, pp. 33-46.

Office Action from the European Patent Office for Application No. 19159021.5, dated May 29, 2020, a counterpart forieng application of U.S. Appl. No. 16/110,927, 8 pages.

Office Action from the European Patent Office for Application No. 19158478.8, dated Jun. 30, 2020, a counterpart foreign application of U.S. Appl. No. 16/268,334, 5 pages.

Office Action for U.S. Appl. No. 16/168,588, dated Oct. 1, 2020, Nguyen, "Identification Process for Suspicious Activity Patterns Based on Ancestry Relationship", 23 Pages.

\* cited by examiner

CARDINALITY-BASED ACTIVITY PATTERN DETECTION

RELATED APPLICATION

This patent application claims priority to U.S. Provisional Application No. 62/634,408 titled "Computer Security," filed on Feb. 23, 2018, commonly assigned herewith, and hereby incorporated by reference.

BACKGROUND

With Internet use forming an ever-greater part of day to day life, security exploits that steal or destroy system resources, data, and private information are an increasing problem. Governments and businesses devote significant resources to preventing intrusions and thefts related to these security exploits. Security exploits come in many forms, such as, for example, computer viruses, worms, trojan horses, spyware, keystroke loggers, adware, and rootkits. These exploits are delivered in or through various mechanisms, such as, for example, spearfish emails, clickable links, documents, executables, or archives. Some of the threats posed by security exploits are of such significance that they are described as cyber terrorism or industrial espionage.

To meet the threats posed by these security exploits, tools capable of retrospective analysis of system performance and state have been developed. For example, the BackTracker tool described in "Backtracking Intrusions" by Samuel T. King and Peter M. Chen (ACM SIGOPS Operating Systems Review—SOSP '03, Volume 37, Issue 5, December 2003, pgs. 223-236) automatically identifies potential sequences of steps that occurred in an intrusion by analyzing a comprehensive log of system activities and data. While such tools can detect security exploits and their manners of operation, they can only operate retrospectively and thus place those attacked at a disadvantage, always one step behind the attacker. Further, these techniques typically operate only on records of a single device, and thus lack the context of activities occurring on other devices, which may be important in determining whether novel or unusual behavior is suspect.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
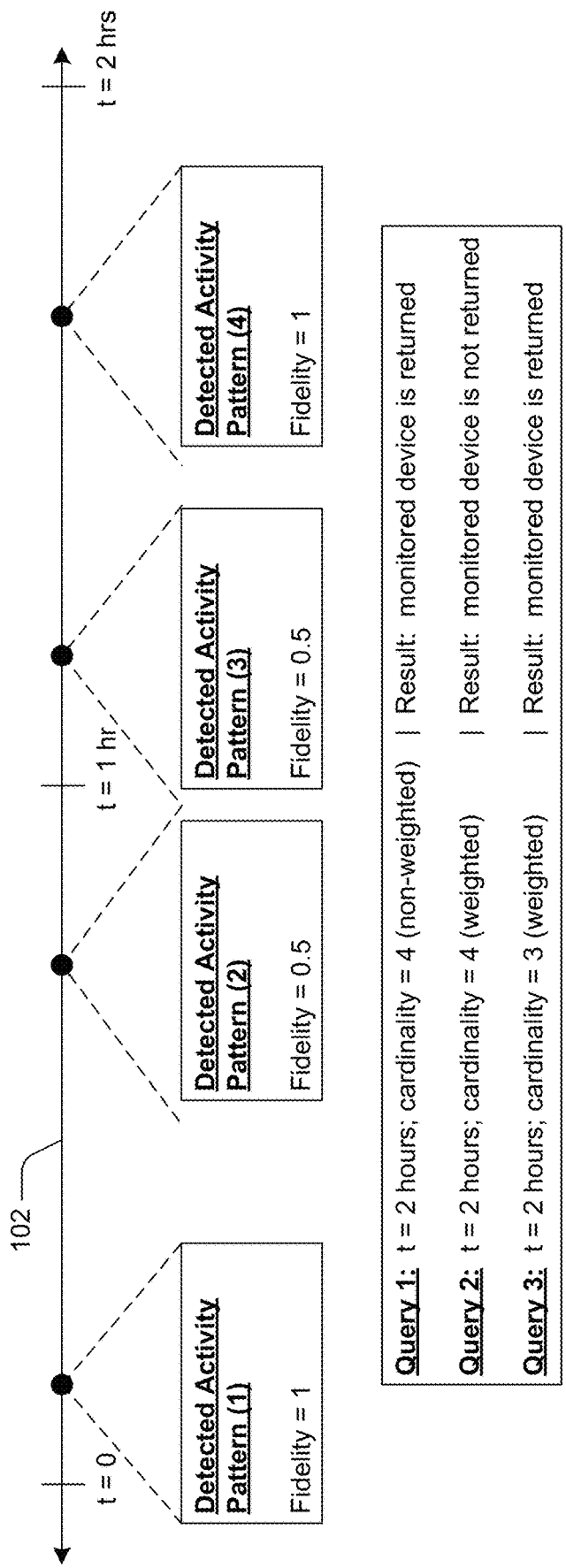
FIG. 1 is a pictorial diagram illustrating an example scenario in which activity patterns are detected and cardinality-based activity pattern detection is performed.

This disclosure describes detecting multiple activity patterns that, individually, may be less suspicious than when considered as a group. Attacks or other types of malicious activity against a computer system are typically initiated by an individual or entity, and can often be detected based on the occurrence of anomalous or unusual activity within a computer system being attacked. Furthermore, attacks or other types of malicious activity often include multiple, distinct occurrences of unusual activity within a relatively short time period.

A detected activity pattern is a set of one or more discrete behaviors that are related through execution flow. For example, if an adversary system attacks another computer system with a ransomware process, the process may begin execution, at some point in the execution chain it enumerates files on the hard drive, it later deletes backup files, and later encrypts files. Accordingly, an activity pattern can be defined to detect, within a single execution flow, discrete behaviors of enumerating files on the hard drive, deleting backup files, and encrypting files. Other defined activity patterns may include, for example, an activity pattern to detect unusual scheduled task creation, an activity pattern to detect specific kinds of archive file creation, and an activity pattern to detect internal reconnaissance commands.

Activity patterns can be defined, for example, based on various kill chain stages, which, in cybersecurity, refers to the various stages an attacker has to go through in order to meet their objectives. For example, a kill chain associated with credential theft may be different from a kill chain associated with a ransomware attack.

Defined activity patterns have various levels of fidelity, which represents a degree to which the activity pattern, when detected, reliably indicates malicious behavior. For example, an activity pattern to detect credential theft may have a high fidelity, meaning that when that particular activity pattern is detected, there is a strong likelihood that malicious activity is occurring on the computer system being monitored. In contrast, an activity pattern to detect unusual ping commands may have a low fidelity, meaning that when that particular activity pattern is detected, it may be suspicious, but there is a good chance that there is no malicious activity occurring.

Because malicious activity often involves, at least in part, behaviors that may occur relatively frequently with no malicious activity (e.g., detected by a low-fidelity activity pattern), activity patterns that detect these behaviors are said to be "noisy." However, when malicious activity occurs, it may be that multiple activity patterns, including noisy activity patterns, may be detected within a relatively short time period. Collectively, multiple distinct activity patterns detected within a relatively short time period may be less noisy, and thus have a higher collective fidelity than each activity pattern detected individually.

Accordingly, in addition to detecting defined activity patterns on a monitored computing system, the techniques described herein also identify occurrences of multiple activity pattern detections within a predefined time period.

Example Query Scenario

FIG. 1 illustrates an example scenario in which multiple defined activity patterns are detected, and multiple cardinality-based activity pattern detections (i.e., queries) are executed. In various implementations, cardinality-based activity pattern queries may be weighted or non-weighted. Weighted cardinality-based activity pattern queries consider the fidelity of the detected activity patterns, while non-weighted cardinality-based queries do not consider the fidelity of the detected activity patterns. FIG. 1 illustrates the results of both weighted and non-weighted cardinality-based activity pattern queries.

In the illustrated example scenario, timeline 102 represents a two-hour time window, during which four distinct defined activity patterns are detected on a particular computing system that is being monitored. In the illustrated example, each of the detected activity patterns has an associated fidelity value of 0.5 or 1. For example, a fidelity value of 1 indicates a high-fidelity activity pattern, while a fidelity value of 0.5 indicates a low-fidelity activity pattern. The values shown in this example are merely exemplary. In various embodiments, fidelity values (or scores or weights) may be defined in any number of ways, and may be further or alternatively based on characteristics other than fidelity.

In the illustrated example, if a cardinality-based activity pattern query (Query 1) is executed with a time period of two hours and a (non-weighted) cardinality of four, the monitored computing device represented in FIG. 1 would be indicated in the results of the query because four distinct activity patterns were detected on the monitored computing device during the two hour time period.

As another example, if a cardinality-based activity pattern query (Query 2) is executed with a time period of two hours and a (weighted) cardinality of four, the monitored computing device would not be indicated in the results of the query even though four distinct activity patterns were detected on the monitored computing device during the two hour time period. In this example, the cardinality is determined based on the sum of the fidelity values of the detected activity patterns. In this particular example, the sum of the fidelity value is three, which is less than the query-specified cardinality value of four, so the monitored computing device does not meet the criteria of the cardinality-based activity pattern query.

As a third example, if a cardinality query (Query 3) is executed with a time period of two hours and a (weighted) cardinality of three, the monitored computing device would be indicated in the results of the query. The monitored computing device would be indicated because the sum of the fidelity values of the detected activity patterns is greater than or equal to the cardinality of the query. In this case, both the sum of the fidelity values and the cardinality is three.

As described herein, cardinality-based activity pattern queries may be weighted or non-weighted. Furthermore, other characteristics may be specified to further refine the results of a particular cardinality-based activity pattern query. For example, cardinality-based activity pattern queries may be written to identify multiple defined activity patterns detected on a single computing device, across multiple computing devices associated with a single entity, within a single process tree, associated with similar (or different) kill chain stages, within a particular time period, having a particular fidelity weight or score, having at least one or more detected activity patterns with a minimum fidelity weight or score, etc., or any combination thereof.

Example Network and Security Service System

Figure 2:
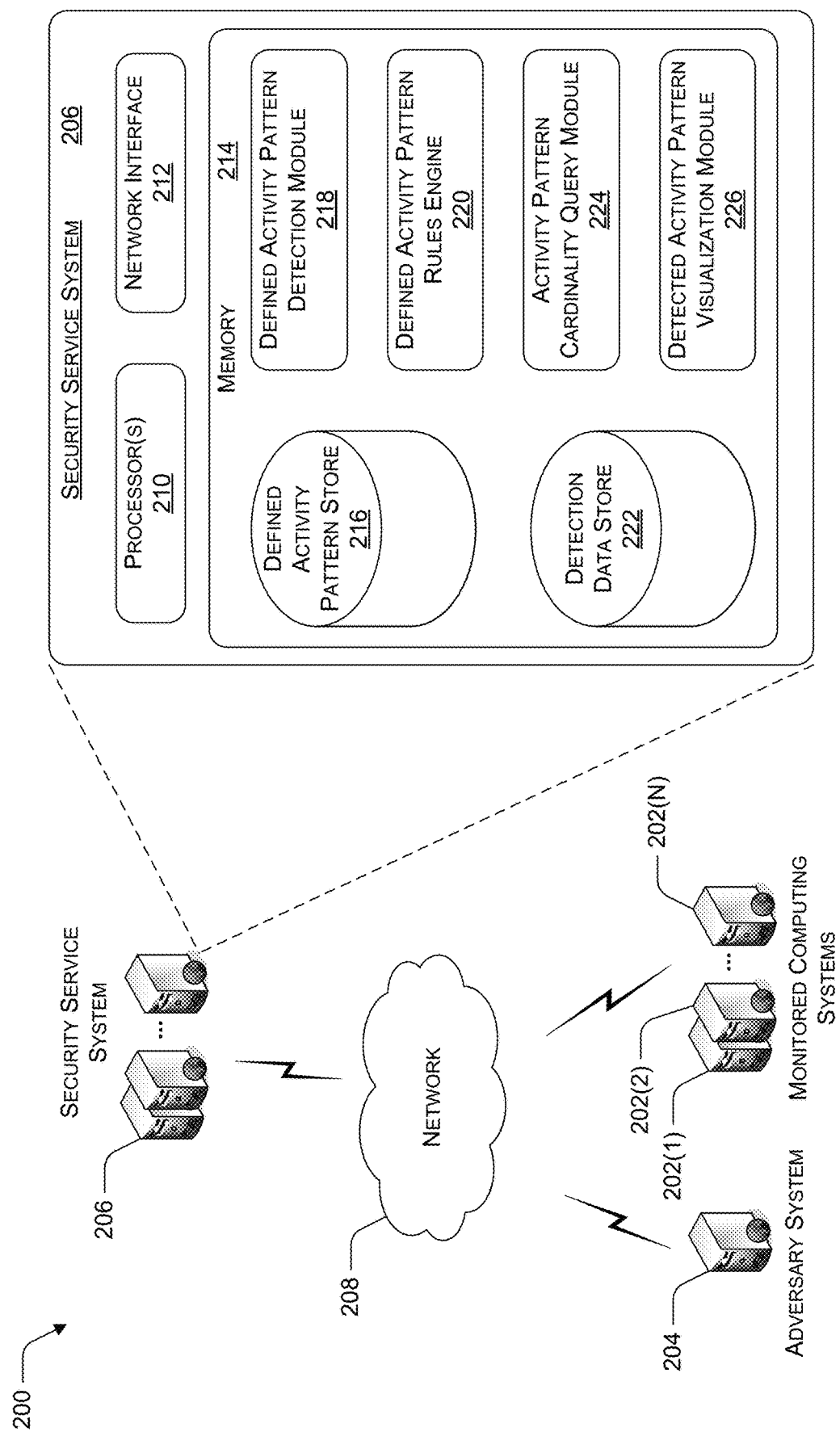
FIG. 2 is a block diagram illustrating an example environment in which cardinality-based activity pattern detection may be implemented, including select components of an example security service system to implement cardinality-based activity pattern detection.

FIG. 2 illustrates an example environment 200 in which cardinality-based activity pattern detection may be implemented. Example environment 200 includes monitored computing systems 202(1), 202(2), . . . , 202(N), an adversary system 204, and a security service system 206. A network 208 enables communication between the monitored computing systems 202, the adversary system 204, and the security service system 206.

In various embodiments, the network 208 may include any one or more networks, such as wired networks, wireless networks, and combinations of wired and wireless networks. Further, the network 208 may include any one or combination of multiple different types of public or private networks (e.g., cable networks, the Internet, wireless networks, etc.). In some instances, computing devices communicate over the network 208 using a secure protocol (e.g., https) and/or any other protocol or set of protocols, such as the transmission control protocol/Internet protocol (TCP/IP).

Each monitored computing system 202 executes a security agent that is configured to transmit data to the security service system 206 for detection of defined activity patterns. The security agent may, in some implementations, also perform activity pattern detection at the monitored computing system. In some embodiments, a particular monitored computing system 202 may be a server or server farm, multiple distributed server farms, a mainframe, a work station, a PC, a laptop computer, a tablet computer, a PDA, a cellular phone, a media center, an embedded system, or any other sort of device or devices. When implemented across multiple computing devices, a monitored computing system 202 may distribute the security agent among the multiple computing devices. In some implementations, a monitored computing system 202 represents one or more virtual machines implemented on one or more computing devices.

In some embodiments, one or more monitored computing systems 202 may be connected to the security service system 206 via a secure channel, such as a virtual private network (VPN) tunnel or other sort of secure channel and may provide data conveying security-relevant information to the security service system 206 through the secure channel. The security agents on one or more monitored computing systems 202 may also receive configuration updates, instructions, remediation, etc. from the security service system 206 via the secure channel.

Adversary system 204 represents a computing device through which a suspicious or malicious activity is initiated, causing one or more suspicious behaviors to occur on one or more monitored computing systems 202.

Example security service system 206 is configured to detect, monitor, and/or respond to suspicious behaviors occurring on the monitored computing systems 202. The security service system 206, which may include a plurality of security service devices, receives security-relevant information from a monitored computing system 202, via the network 208. The monitored computing system 202 may be part of a group, such as a customer or other entity, which may connect the monitored computing system 202 to the network 208 and to other monitored computing systems 202. The monitored computing system 202 may be configured with a security agent that sends data representing events that include security-relevant information to the security service system 206. The security service system 206 analyzes the received data against defined activity patterns to determine, for example, whether a process running on the monitored computing system 202 is suspicious.

The devices implementing the security service system 206 may each be or include a server or server farm, multiple distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the security service system 206 represent a plurality of computing devices working in communication, such as a cloud computing network of nodes. When implemented on multiple computing devices, the security service system 206 may distribute modules and data of the security service system 206 among the multiple computing devices. In some implementations, one or more of the devices implementing the security service system 206 represent one or more virtual machines implemented on one or more computing devices.

Example security system 206 includes one or more processors 210, a network interface 212, and a memory 214. Processors 210 may be configured as a central processing unit (CPU), a graphics processing unit (GPU), or both CPU and GPU, or other processing unit or component known in the art.

The network interface 212 enables the security service system 206 to communicate with other computing devices, such as any or all of the monitored computing systems 202.

Memory 214 stores various components for execution by the processor(s) 210, including, for example, defined activity pattern store 216, defined activity pattern detection module 218, defined activity pattern rules engine 220, detection data store 222, activity pattern cardinality query module 224, and detected activity pattern visualization module 226.

Defined activity pattern store 216 maintains activity patterns for detection. Based on ongoing data analysis of, for example, monitored computing systems 202, defined activity patterns may change frequently, being updated, added, or removed as new forms of malicious activity are detected and data analysis is refined. In an example implementation, defined activity pattern store 216 may maintain data defining hundreds or thousands of defined activity patterns.

In an example implementation, defined activity pattern store 216 also includes data identifying a subset of defined activity patterns to be included in one or more activity pattern cardinality queries (or a subset of defined activity patterns to be excluded from one or more activity pattern cardinality queries). For example, a particular defined activity pattern may be known to be generally benign, even in combination with other defined activity patterns. In this case, the particular activity pattern may be tagged in the defined activity pattern store 216 to be excluded from any activity pattern cardinality queries.

Defined activity pattern detection module 218 compares data received from monitored computing systems 202 to the activity patterns in defined activity pattern store 216 to detect suspicious or malicious activity. In an example implementation, activity pattern detection is performed in near real-time as data is received from monitored computing systems 202. In an example implementation, hundreds of thousands of defined activity pattern detections may occur in a single hour.

Defined activity pattern rules engine 220 processes data associated with detected activity that matches a particular defined activity pattern. Defined activity pattern rules engine 220 may be configured to add context data such as data identifying a customer and data identifying a particular computing device on which the activity pattern was detected. Defined activity pattern rules engine 220 may be further configured to add one or more tags, which may include, for example, indicators of whether or not the particular detected activity pattern is to be considered in one or more cardinality-based activity pattern queries. For example, a particular low-fidelity activity pattern may be tagged to be excluded from one or more cardinality-based activity pattern queries based on a determination that inclusion of the activity pattern is not likely to add information of value to the query results.

Detection data store 222 maintains a collection of data representing defined activity patterns that have been detected. For each detected activity pattern, detection data store 220 may include, for example, data representing the process that matched a particular defined activity pattern, data identifying the defined activity pattern that was detected, data indicating a time (e.g., a date and time) at which the activity pattern occurred, and any metadata or tags that may have been generated by rules engine. In an example implementation, detection data store 222 may be implemented as an elasticsearch database, although any other type of data structure that supports optimized queries may be considered.

Activity pattern cardinality query module 224 may be implemented, for example, as an API, and may include any number of queries that are each executable to identify a plurality of detected activity patterns that may, when considered as a group, indicate suspicious or malicious activity. Activity pattern cardinality query module 224 may include queries having a default cardinality (e.g., defined to identify three or more detected activity patterns) and a default time period (e.g., defined to query against defined activity patterns detected within the past two hours). In an example implementation, activity pattern cardinality queries with a default cardinality and a default time period may be run automatically at predefined intervals (e.g., every 30 minutes or every hour). Activity pattern cardinality query module 224 may also include queries for which the cardinality, the time period, and/or other characteristics may be user-defined. For example, upon reviewing the results of an activity pattern cardinality query that was run automatically with a pre-defined cardinality and a pre-defined time period, a data analyst may then access the activity pattern cardinality query API to execute a follow-up query with a user-defined cardinality, a user-defined time period, and/or other user-defined filters or attributes. For example, a first activity pattern cardinality query may be executed automatically to identify any monitored computing system 202 on which three or more distinct defined activity patterns have been detected within the past two hours. Upon reviewing the results of that query, a data analyst may then access the activity pattern cardinality query module API to specify a new query to identify five or more distinct detected defined activity patterns on a particular monitored computing system within the past 24 hours.

Detected activity pattern visualization module 226 generates a data visualization for presenting results of activity pattern cardinality queries. Any number of data visualization techniques may be used to present a visual representation of the activity pattern cardinality query results.

Although not shown, security service system 206 may additionally include one or more input device, and one or more output devices. Input devices may include, for example, a keyboard, a mouse, a touch-sensitive display, voice input device, etc. Output devices may include, for example, a display, speakers, a printer, etc. These devices are well known in the art and need not be discussed at length here.

In various embodiments, the memory 214 may be volatile (such as RAM), non-volatile (such as ROM, flash memory, etc.) or some combination of the two. Furthermore, memory 214 may include removable storage and/or non-removable storage. The various components and modules stored in the memory 214 may include, for example, methods, threads, processes, applications or any other sort of executable instructions, such as the instructions utilized to perform operations of the security service system 206 in conjunction with other devices of the security service system 206 (in examples in which the security service system 206 includes multiple devices). The various components and modules stored in the memory 214 may also include files and databases.

The security service system 206 may also include additional data storage devices (removable and/or non-removable) such as, for example, magnetic disks, optical disks, or tape. Non-transitory computer-readable media may include volatile and nonvolatile, removable and non-removable media implemented in any method or technology for storage of information. The memory 214 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, tangible medium which can be used to store the desired information and which can be accessed by the security service system 206. Any such non-transitory computer-readable media may be part of the security service system 206.

Example Monitored Computing System

Figure 3:
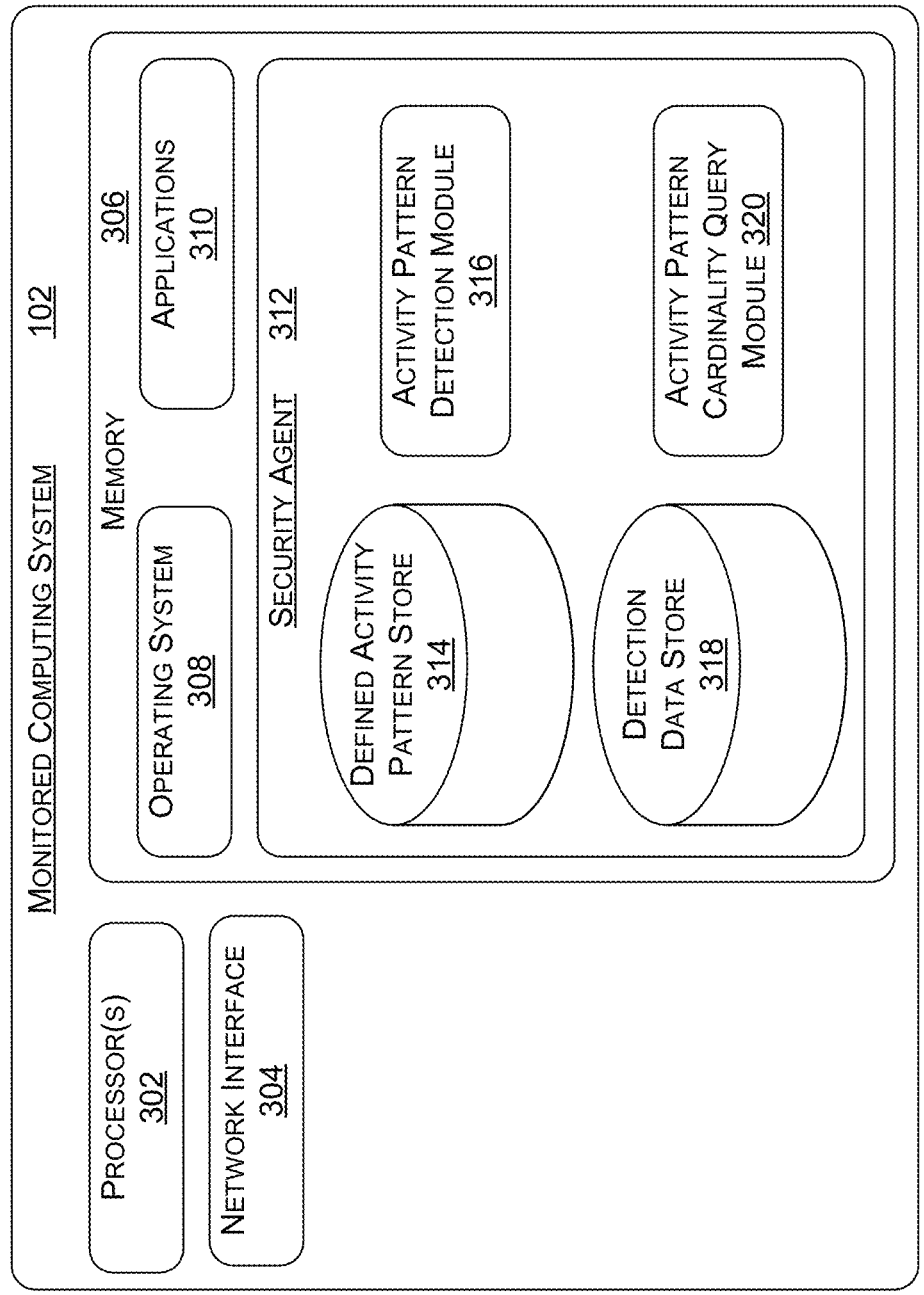
FIG. 3 is a block diagram illustrating select components of an example monitored computing system.

FIG. 3 illustrates select components of an example monitored computing system 202. Example monitored computing system 202 includes one or more processors 302, a network interface 304, and a memory 306 that is communicatively coupled to the processor(s) 302.

In some embodiments, the processor(s) 302 is implemented as a central processing unit (CPU), a graphics processing unit (GPU), or both a CPU and a GPU, or other processing units or components known in the art.

Network interface 304 enables the monitored computing system 202 to communicate with other computing devices, such as security service system 206.

The memory 306 may store various components that are communicatively coupled to each other and are executable by the processor(s) 302, including, for example, an operating system 308, any number of applications 310, and a security agent 312, which may be provided, for example, by the security service system 206. Memory 306 may include removable storage and/or non-removable storage.

Example security agent 312 includes defined activity pattern store 314, activity pattern detection module 316, detection data store 318, and activity pattern cardinality query module 320.

Defined activity pattern store 314 maintains activity patterns for detection at the monitored computing system. Defined activity pattern store 314 may include, for example, a subset of activity patterns found in defined activity pattern store 216 of security service system 206 and/or may include additional activity patterns not found in defined activity pattern store 216 of security service system 206. For example, one or more activity patterns in defined activity pattern store 314 may be defined to detect suspicious behavior based on data that is not intended to be sent to security service system 206. Accordingly, the activity pattern may be maintained in defined activity pattern store 314 for detection at the monitored computing system 202.

Activity pattern detection module 316 compares data at the monitored computing system 202 to the activity patterns in defined activity pattern store 314 to detect suspicious or malicious activity. In an example implementation, activity pattern detection is performed in near real-time as processes are executed on the monitored computing system 202. Data identifying detected activity patterns is sent from monitored computing system 202 to security service system 206 to be stored in detection data store 222. In addition, data identifying detected activity patterns may be stored, at least temporarily, in detection data store 318.

Activity pattern cardinality query module 320 may include any number of queries that are each executable on the monitored computing system 202 to identify a plurality of detected activity patterns that may, when considered as a group, indicate suspicious or malicious activity. The queries may be executed against data in detection data store 318. Activity pattern cardinality query module 320 may include queries having a default cardinality (e.g., defined to identify three or more detected defined activity patterns) and a default time period (e.g., defined to query against defined activity patterns detected within the past 30 minutes). In an example implementation, cardinality-based activity pattern queries with a default cardinality and a default time period may be run automatically at predefined intervals (e.g., every 10 minutes). In an example implementation, cardinality-based activity pattern queries executed on the monitored computing system 202 may be executed more frequently than cardinality-based activity pattern queries executed on the security service system 206, due, at least in part, to a more limited data set available on the monitored computing system 202 as compared to the data set available to the security service system 206.

In an example implementation, activity pattern cardinality query module 320 is configured to identify detection of multiple defined activity patterns within a short time period at the monitored computing system. If an activity pattern cardinality query returns results at the monitored computing system 202, those results may be sent to the security service system for further processing. In some scenarios, executing activity pattern cardinality queries at the monitored computing system 202 may enable more rapid detection of malicious activity than executing similar activity pattern cardinality queries at the security service system.

In various embodiments, the memory 306 may be volatile (such as RAM), non-volatile (such as ROM, flash memory, etc.) or some combination of the two. The various components and modules stored in the memory 306 may include methods, threads, processes, applications or any other sort of executable instructions. Various components and modules stored in the memory 306 may also include files and databases.

The memory 306 may also include additional data storage devices (removable and/or non-removable) such as, for example, magnetic disks, optical disks, or tape. Non-transitory computer-readable media may include volatile and nonvolatile, removable and non-removable media implemented in any method or technology for storage of information. The memory 306 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, tangible medium which can be used to store the desired information and which can be accessed by the monitored computing system 202. Any such non-transitory computer-readable media may be part of the monitored computing system 202.

Although not shown, monitored computing system 202 may also include one or more input devices, such as a keyboard, a mouse, a touch-sensitive display, voice input device, etc., and one or more output devices, such as a display, speakers, a printer, etc. These devices are well known in the art and need not be discussed at length here.

Example Visualizations

Figure 4:
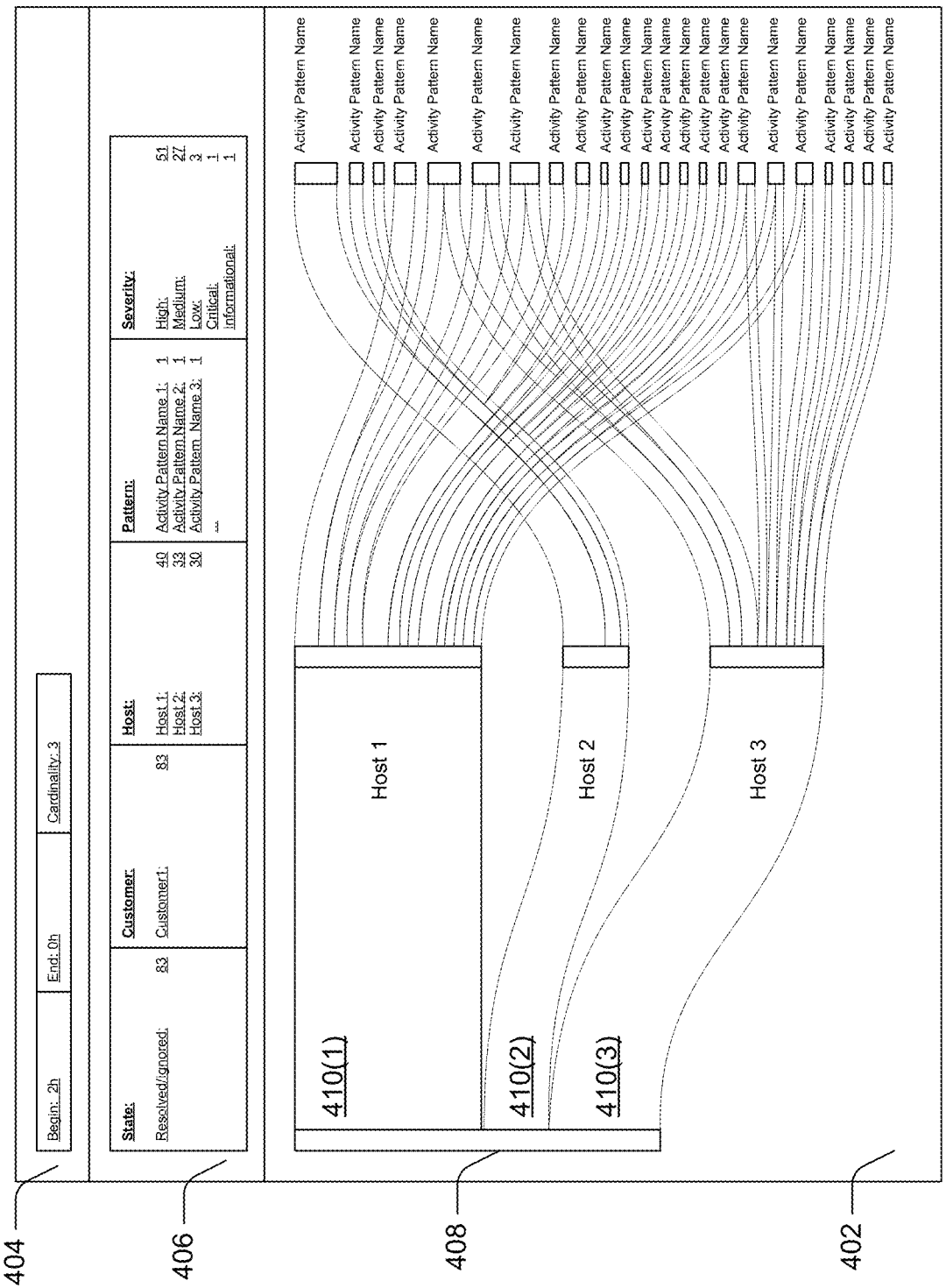
FIG. 4 is a pictorial diagram illustrating an example user interface for presenting a visualization of data representing a cardinality-based activity pattern detection.

FIG. 4 illustrates an example visualization for presenting cardinality-based activity pattern query results. In the illustrated example, a user interface 400 includes a visualization area 402, a query area 404, and a details area 406.

In the illustrated example, query area 404 indicates the time period and cardinality that was used in the query. In the illustrated example, a two-hour window (from 2 hours ago to 0 hours ago) was used, with a cardinality of three. The query results are shown in visualization area 402, with the bar 408 on the left indicating a particular customer, which may have multiple monitored computing systems. Bars, 410(1), 410(2), and 410(3), each represent a monitored computing system that is associated with a result of the cardinality-based activity pattern query. Each block on the far right represents a particular defined activity pattern that was detected, and each wavy bar between a host and an activity pattern name indicates that the particular activity pattern was detected during the particular time frame at the particular monitored computing system.

Details area 406 provides additional details about the data shown in the visualization are 402. For example, details area 406 may provide data indicating a status of each detected activity pattern, data indicating each customer associated with the detected activity patterns, data indicating each host device associated with the detected activity patterns, a list of the detected activity patterns, and a severity level associated with the detected activity patterns. The data illustrated in FIG. 4 is merely one example, and any type of data associated with the query results may be presented via a similar user interface.

In an example implementation, user interface 400 may enable a data analyst to interact with the query results, changing the visualization based on various selections. For example, a user may select a particular activity pattern, either by selecting a block in the visualization area or by selecting an item from the details area. As a result, the data visualization may be modified to only show the data associated with the selected activity pattern.

Similarly, in an example implementation, user interface 400 may enable a data analyst to interactively specify and execute additional cardinality-based activity pattern queries. For example, a user may change the begin time, the end time, and/or the cardinality and re-run the query to see a different query result set.

Figure 5:
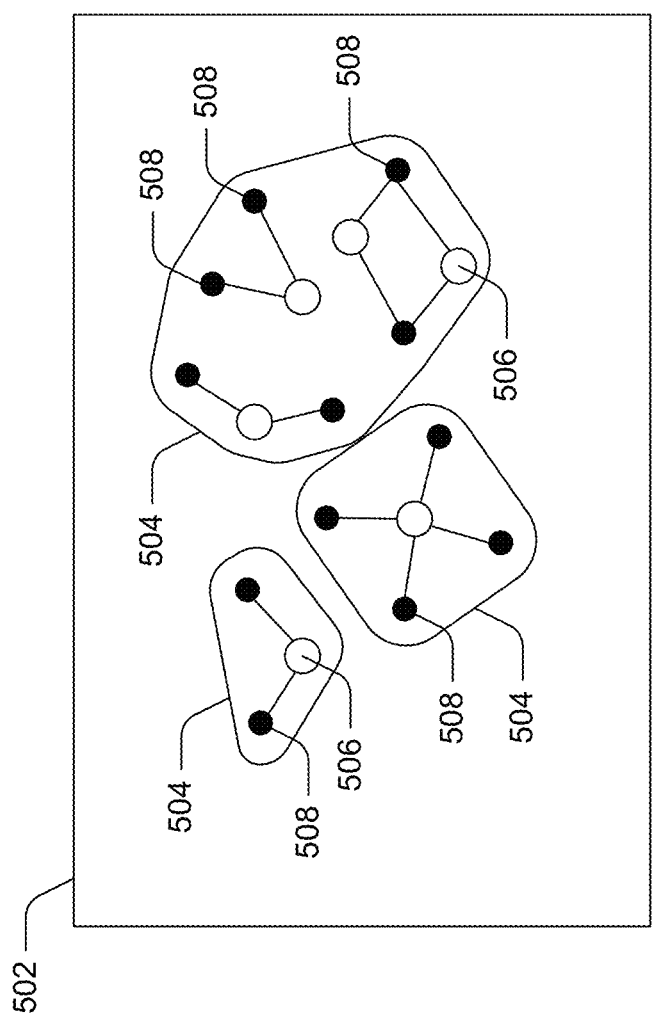
FIG. 5 is a pictorial diagram illustrating an example of a data visualization format for presenting data representing a cardinality-based activity pattern detection.

FIG. 5 illustrates a portion of another example data visualization 502. In this example, each customer is represented as a rounded polygon 504, each monitored computing device is represented as a white circle 506, and each detected activity pattern is represented as a black circle 508. In an example implementation, when presented within a user interface, a sidebar area may display various details associated with a particular component of the visualization, for example, when a pointer is hovered over the particular component. For example, if a user hovers a mouse over a particular white circle, the sidebar may display data indicating the customer associated with the monitored computing device, the name of the monitored computing device, and one or more activity patterns that were detected at the monitored computing device.

Example Processes

Figure 6:
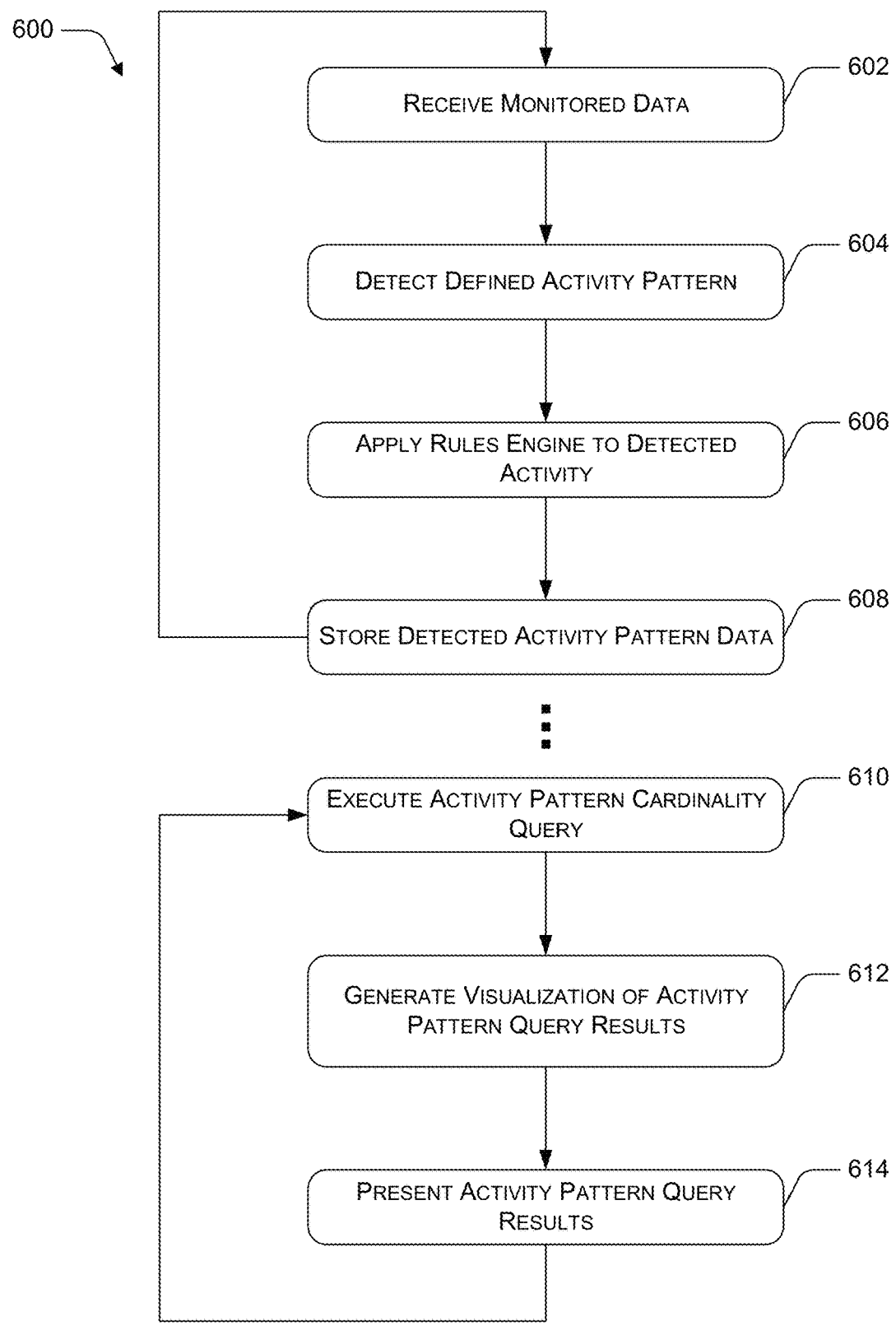
FIG. 6 is a flow diagram illustrating an example process for performing cardinality-based activity pattern detection by a security service system.
Figure 7:
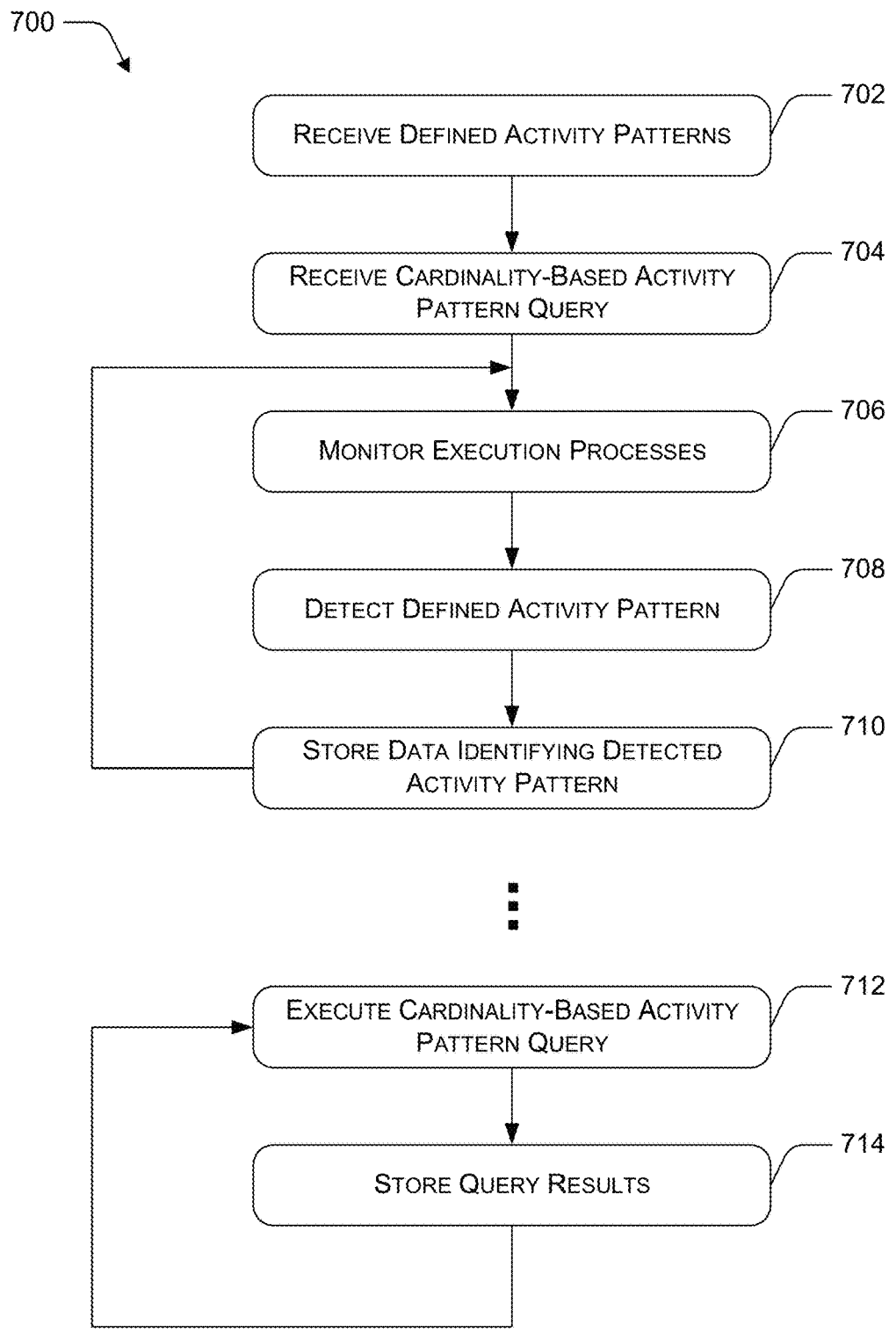
FIG. 7 is a flow diagram illustrating an example process for performing cardinality-based activity pattern detection at a monitored computing device.
Figure 8:
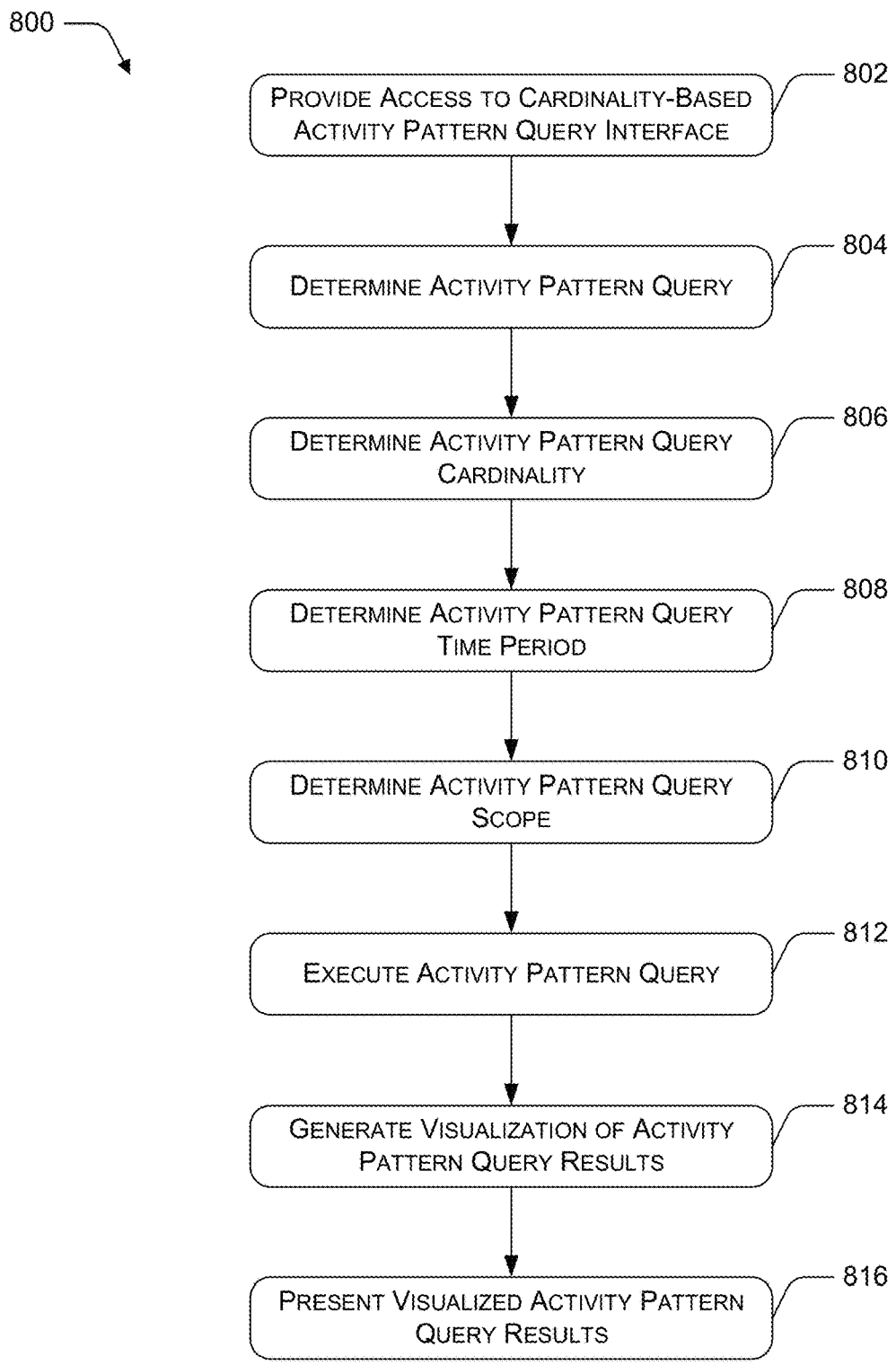
FIG. 8 is a flow diagram illustrating an example process for performing cardinality-based activity pattern detection based, at least in part, on user input.

FIGS. 6-8 illustrate example processes for detecting cardinality-based activity patterns. These processes are illustrated as logical flow graphs, each operation of which represents a sequence of operations that can be implemented in hardware, software, or a combination thereof. In the context of software, the operations represent computer-executable instructions stored on one or more non-tangible computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for executing a cardinality-based activity pattern query at a security service system.

At block 602, monitored data is received. For example, security service system 206 receives, in near real-time, data representing security-relevant information from security agent 312 on monitored computing system 202 to security service system 206. In an example implementation, monitored data is received from multiple monitored computing systems 202.

At block 604, a defined activity pattern is detected. For example, activity pattern detection module 218 compares the data received from the monitored computing systems 202 to activity patterns in defined activity pattern store 216. An activity pattern detection occurs when the received data matches a defined activity pattern.

At block 606, a rules engine is applied to the detected activity pattern. For example, defined activity pattern rules engine 220 may apply any combination of metadata and/or tags to data representing a detected activity pattern.

At block 608, data identifying the detected activity pattern is stored. For example, the data representing the detected activity pattern, along with any metadata and/or tags generated by the defined activity pattern rules engine 220, is stored in detection data store 222.

Processing described with reference to blocks 602-608 continues repeatedly.

At block 610, a cardinality-based activity pattern query is executed. For example, activity pattern cardinality query module 224 executes one or more pre-defined cardinality-based activity pattern queries. In an example implementation, activity pattern cardinality query module 224 may be configured to execute one or more cardinality-based activity pattern queries at pre-defined, periodic intervals (e.g., every hour).

At block 612, a visualization of the activity pattern query results is generated. For example, if the query executed at block 610 returns results (e.g., an indication of one or more monitored computing systems 202 on which a plurality of defined activity patterns were detected during a time period specified in the query), detected activity pattern visualization module 226 generates a data visualization based on the query results. For example, detected activity pattern visualization module 226 may generate a data visualization of one of the formats shown in FIG. 4 or FIG. 5.

At block 614, the query results are presented. For example, security system 206 presents a user interface 400 via a display or a web interface.

Processing described with reference to blocks 612-614 continues repeatedly.

FIG. 7 illustrates an example process 700 for periodically executing a cardinality-based activity pattern query at a monitored computing system.

At block 702, defined activity patterns are received. For example, security agent 312 of monitored computing system 202 receives one or more defined activity patterns from security service system 206. The received activity patterns may be, for example, a subset of activity patterns stored in defined activity pattern store 216, and/or may include activity patterns not found in defined activity pattern store 216. The received activity patterns may be stored, for example, in defined activity pattern store 314.

At block 704, a cardinality-based activity pattern query is received. For example, security agent 312 of monitored computing system 202 receives one or more cardinality-based activity pattern queries from security service system 206. The received cardinality-based activity pattern queries are to be executed on the monitored computing system 202 to perform cardinality-based activity pattern detection.

Processing described with reference to blocks 702 and/or 704 may be repeated periodically, as defined activity patterns and/or cardinality-based activity pattern queries are updated by the security service system 206.

At block 706, execution processes are monitored. For example, activity pattern detection module 316 monitors processes being executed on monitored computing system 202.

At block 708 an IoA is detected. For example, activity pattern detection module 316 compares a process being executed on monitored computing system 202 to activity patterns in defined activity pattern store 314. When an execution process matches a defined activity pattern, activity pattern detection module 316 generates data identifying a defined activity pattern detection.

At block 710, data identifying the detected activity pattern is stored. For example, security agent 312 stores the data generated at block 708 in detection data store 318. The generated data may also be transmitted to security service system 206 for storage in detection data store 222.

Processing described with reference to blocks 706-710 is repeated as additional processes are executed on monitored computing system 202.

At block 712, the cardinality-based activity pattern query is executed. For example, activity pattern cardinality query module 320 executes the cardinality-based activity pattern query against detection data store 318.

At block 714, results of the activity pattern cardinality query are stored. For example, the activity pattern cardinality query module 320 may store the query results to detection data store 318 and/or transmit the query results to security service system 206.

Processing described with reference to blocks 712 and 714 may be repeated periodically at predefined intervals and/or as additional defined activity patterns are detected by activity detection module 316.

FIG. 8 illustrates an example process 800 for executing a cardinality-based activity pattern query at a security service system based, at least in part, on user input.

At block 802, access to a cardinality-based activity pattern query interface is provided. For example, activity pattern cardinality query module 224 provides an API through which a user can specify one or more queries having user-specified query attributes.

At block 804, an activity pattern query is determined. For example, a user-submitted selection is received through the activity pattern query API.

At block 806, a cardinality is determined for the activity pattern query. For example, through the activity pattern query API, a user may specify a cardinality for the selected activity pattern query.

At block 808, a time-period is determined for the activity pattern query. For example, through the activity pattern query API, a user may specify a time-frame for the selected activity pattern query.

At block 810, a scope is determined for the activity pattern query. For example, through the activity pattern query API, a user may specify that the query is to run against data associated with all monitored computing systems 202, monitored computing systems 202 associated with a particular customer, selected one or more particular monitored computing systems 202, or the like.

At block 812, the activity pattern query is executed. For example, activity pattern cardinality query module 224 executes the query as defined based on the user-submitted input.

At block 814, a visualization of the activity pattern query results is generated. For example, detected activity pattern visualization module 226 generates a data visualization representing the results of the executed query. Example data visualization formats are illustrated in FIG. 4 and FIG. 5.

At block 816, the visualized activity pattern query results are presented. For example, security service system 206 presents the generated data visualization through a user interface such as a web interface.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
monitoring data generated at a computing system;
detecting, within the data, a first activity pattern;
detecting, within the data, a second activity pattern;
determining a first fidelity value that represents a degree to which the first activity pattern indicates malicious activity;
determining a second fidelity value that represents a degree to which the second activity pattern indicates malicious activity;
based, at least in part, on detecting both the first activity pattern and the second activity pattern, triggering a notification of possible malicious activity;
determining, based at least in part on the data, one or more cardinality-based activity pattern queries, wherein a query of the one or more cardinality-based activity pattern queries specifies an activity pattern cardinality and a predefined interval to execute the query, wherein the activity pattern cardinality indicates a number of distinct activity patterns, wherein a result of the query indicates a plurality of detected activity patterns that satisfy the activity pattern cardinality; and transmitting the one or more cardinality-based activity pattern queries to at least one or more computing devices monitored by the computing system.

2. A method as recited in claim 1, wherein triggering the notification is based, at least in part, on the first activity pattern and the second activity pattern being detected within a predefined time period.

3. A method as recited in claim 1, wherein the first activity pattern has associated therewith a fidelity value that represents a degree to which the first activity pattern indicates malicious activity, the method further comprising:
comparing the fidelity value to a threshold value; and
in response to determining that the fidelity value is below the threshold value, preventing triggering a notification of possible malicious activity in response to detecting only the first activity pattern.

4. A method as recited in claim 1, wherein the second activity pattern has associated therewith a fidelity value that represents a degree to which the second activity pattern indicates malicious activity, the method further comprising:
comparing the fidelity value to a threshold value; and
in response to determining that the fidelity value is below the threshold value, preventing triggering a notification of possible malicious activity in response to detecting only the second activity pattern.

5. A method as recited in claim 1, further comprising:
determining a third fidelity value that represents a degree to which detection of both the first activity pattern and the second activity pattern within a pre-defined time period indicates malicious activity;
comparing the first fidelity value to a first threshold value;
in response to determining that the first fidelity value is below the first threshold value, preventing triggering a notification of possible malicious activity based on identifying the first activity pattern;
comparing the second fidelity value to the first threshold value;
in response to determining that the second fidelity value is below the first threshold value, preventing triggering a notification of possible malicious activity based on identifying the second activity pattern;
comparing the third fidelity value to a second threshold value; and
in response to determining that the third fidelity value is above the second threshold value, triggering the notification of possible malicious activity.

6. A method as recited in claim 5, wherein the third fidelity value is calculated as a combination of the first fidelity value and the second fidelity value.

7. A method as recited in claim 5, wherein the third fidelity value is calculated as a sum of the first fidelity value and the second fidelity value.

8. A method as recited in claim 5, wherein the third fidelity value is calculated as a weighted sum of the first fidelity score and the second fidelity score.

9. A method as recited in claim 1, wherein triggering the notification of possible malicious activity comprises:
generating a data visualization that graphically depicts the detecting of the first activity pattern and the detecting of the second activity pattern at the computer system.

10. A method as recited in claim 1, wherein the computer system comprises a plurality of computing devices communicatively connected to a local area network associated with a particular entity.

11. A system comprising:
one or more processors;
a memory communicatively coupled to the one or more processors;
a network interface for transmitting one or more cardinality-based activity pattern queries to a plurality of monitored computing systems and receiving security-relevant data from the plurality of monitored computing systems;
an activity pattern detection module stored in the memory and executable by the processor, the activity pattern detection module configured to detect activity patterns in the received security-relevant data based on a comparison of the received security-relevant data to a plurality of defined activity patterns, wherein an individual activity pattern of the activity patterns has an associated fidelity value, wherein an individual defined activity pattern represents one or more discrete behaviors that may occur in a single execution flow on a monitored computing system of the plurality of monitored computing systems;
a detection data store configured to maintain data representing the detected activity patterns, wherein the data representing a particular detected activity pattern includes:
a time at which the activity pattern occurred; and
data indicating a particular monitored computing system of the plurality of monitored computing systems on which the activity pattern occurred;
an activity pattern cardinality query module stored in the memory and executable by the processor, the activity pattern cardinality query module configured to execute a query of the one or more cardinality-based activity pattern queries against the detection data store, wherein:
the query specifies a cardinality, wherein the cardinality indicates a number of distinct activity patterns;
the query specifies a time period and a predefined interval; and
when the query is executed, results of the query indicate one or more monitored computing systems of the plurality of monitored computing systems on which activity patterns satisfying the specified cardinality occurred within the time period.

12. A system as recited in claim 11, wherein:
the data representing a particular detected activity pattern further includes a weight associated with the activity pattern; and
the cardinality indicates a composite weight value.

13. A system as recited in claim 12, wherein, the weight associated with the activity pattern represents a fidelity of the activity pattern.

14. A system as recited in claim 12, wherein a plurality of activity patterns satisfy the specified cardinality when a sum of weights associated with the plurality of activity patterns is greater than or equal to the composite weight value.

15. A system as recited in claim 11, wherein the activity pattern cardinality query module is configured to repeat executing the query at the predefined intervals.

16. A system as recited in claim 11, wherein the cardinality is user-defined.

17. A system as recited in claim 11, wherein the time period is user-defined.

18. A system as recited in claim 11, wherein the query further specifies a scope, wherein the scope defines a subset of the plurality of monitored computing systems over which the query is to be executed.

19. A system as recited in claim 18, wherein the scope is user-defined.

20. A system as recited in claim 11, wherein the query further specifies a scope, wherein the scope defines a subset of the plurality of defined activity patterns to which the query applies.

21. A system as recited in claim 11, further comprising a defined activity pattern store configured to maintain the plurality of defined activity patterns.

22. A system as recited in claim 11, further comprising a detected activity pattern visualization module configured to:
   generate a data visualization representing the results of the query; and
   present the data visualization via a user interface.

23. One or more non-transitory computer-readable media storing instructions that, when executed by a processor, cause a computing device to perform operations comprising:
   determining a plurality of activity patterns, wherein an activity pattern of the plurality of activity patterns has an associated fidelity value;
   receiving, via a security service system from another computing device, one or more cardinality-based activity pattern queries;
   executing a plurality of processes;
   as the plurality of processes are executed, comparing the plurality of processes to the plurality of activity patterns;
   when a process matches an activity pattern of the plurality of activity patterns, recording data indicating a detection of the activity pattern to an activity pattern detection data store and transmitting the data to the security service system;
   executing, based at least in part on the receiving the one or more cardinality-based activity pattern queries, a query against the activity pattern detection data store, wherein the query specifies an activity pattern cardinality and a time interval, wherein the activity pattern cardinality indicates a number of distinct activity patterns, wherein a result of the query indicates a plurality of detected activity patterns that, collectively, satisfy the specified activity pattern cardinality; and
   transmitting results of the query to the security service system.

24. One or more non-transitory computer-readable media as recited in claim 23, wherein:
   the activity pattern cardinality specifies a composite fidelity value.

25. One or more non-transitory computer-readable media as recited in claim 24, wherein the composite fidelity value is a weighted sum of fidelity values associated with the detected activity patterns.

26. One or more non-transitory computer-readable media as recited in claim 23, wherein:
   the query further specifies a time period; and
   the result of the query indicates that the plurality of detected activity patterns that, collectively, satisfy the specified activity pattern cardinality occurred within the time period.

* * * * *